3,799,243

Feb. 25, 1975 H. B. CASTILLO Re. 28,343

LIQUID-VAPOR CYCLE AIR-CONDITION SYSTEM

Original Filed Dec. 4, 1972 2 Sheets-Sheet 1

LIQUID-VAPOR CYCLE AIR-CONDITION SYSTEM

Original Filed Dec. 4, 1972 2 Sheets-Sheet 2

United States Patent

Re. 28,343
Reissued Feb. 25, 1975

28,343

LIQUID-VAPOR CYCLE AIR-CONDITION SYSTEM

Herman B. Castillo, Clawson, Mich., assignor to Eaton Corporation, Cleveland, Ohio Original No. 3,799,243, dated Mar. 26, 1974, Ser. No. 312,012, Dec. 4, 1972. Application for reissue June 27, 1974, Ser. No. 478,153

Int. Cl. F24f *3/14*

U.S. Cl. 165—19 31 Claims

Matter enclosed in heavy brackets [ ] appears in the original patent but forms no part of this reissue specification; matter printed in italics indicates the additions made by reissue.

ABSTRACT OF THE DISCLOSURE

A flame powered liquid-vapor cycle air conditioning system having a turbine, a compressor and a liquid feed pump on a common shaft and a housing rotatably mounting this shaft and defining a liquid reservoir for the pump. The system includes a reversing valve for switching between an air heating mode and an air cooling mode. In the heating mode, the coefficient of performance of the system is improved by recovering waste heat and water vapor from the exhaust gases produced by the flame. In the heating mode, the recovered water is also used to increase the humidity of the conditioned air.

BACKGROUND OF THE INVENTION

Field of the Invention

This invention relates to liquid-vapor cycle air conditioning systems. More particularly, this invention relates to liquid-vapor cycle air conditioning systems of the reversible or "heat pump" type, i.e. systems which are capable of operation in both a heating mode and a cooling mode.

Prior Art

Reversible liquid-vapor cycle air conditioning systems are desirable because they allow dual use of common components. However, prior art systems have not obtained wide acceptance due to a low coefficient of performance in the heating and/or the cooling mode.

SUMMARY OF THE INVENTION

A primary object of this invention is to provide a liquid-vapor cycle air conditioning system with an improved coefficient of performance.

A more specific object is to provide a reversible liquid-vapor cycle system having high performance coefficients in both the heating and cooling modes.

The invention air conditioning system is of the type including a heat exchanger in communication with the enclosure air, another heat exchanger in communication with air outside the enclosure, an expansion valve interposed between the heat exchangers, and a compressor interposed between the heat exchangers and driven by an energy transforming means, such as a turbine, receiving vapor from a vapor generator.

According to another important feature of the invention, the vapor is generated by passing hot gases over the vapor generator, and at least a portion of the hot gases are thereafter directed to the heat exchanger in communication with the outside air whereby to improve the coefficient of performance of the system in the heating mode.

According to another feature of the invention, water condensate is collected from the hot gases as the latter are passed over the outside air heat exchanger and the condensate is then selectively introduced into the enclosure air to control the humidity in the enclosure.

According to still another feature of the invention, the water condensate from the outside air heat exchanger is conducted to a third heat exchanger in the path of the hot gases, wherein it absorbs heat from the hot gases, and thence to a fourth heat exchanger in the path of the enclosure air, where it gives up heat to the enclosure air.

According to an important feature of the invention, the system employs a single refrigerant type fluid for motive power production and air conditioning purposes, and the condensed fluid discharge from the energy transforming means and from the compressor is routed to a reversing valve which functions to selectively route this combined fluid discharge to the enclosure air heat exchanger, whereby to provide a heating operational mode for the system, or to the outside air heat exchanger, whereby to provide a cooling operational mode.

According to still another feature of the invention, with the system functioning in a cooling mode, the water condensate formed on the enclosure air heat exchanger is collected and placed in communication with the outside air heat exchanger to improve the heat dissipation of the outside air heat exchanger.

According to a further feature of the invention, the relative amounts of outside air and hot gases flowing over the outside air heat exchanger are modulated to thereby control the tempertaure of the gas mixture flowing over the outside air heat exchanger.

According to another feature of the invention, a pump on a common shaft with the turbine and compressor is provided between the enclosure air heat exchanger and the vapor generator to facilitate the return of condensed fluid to the generator, means are provided to sense an operational failure of the turbine-compressor-pump unit and establish an alternate fluid flow path between the enclosure air heat exchanger and the generator, thereby bypassing the shaft pump, and another pump is provided in the alternate fluid flow path which is energized in response to the sensed failure to provide an emergency heating mode operation for the system.

These and other objects and features of the invention will be apparent from the drawings and from the description of the preferred embodiment.

DESCRIPTION OF THE PREFERRED EMBODIMENT

Figure 1:
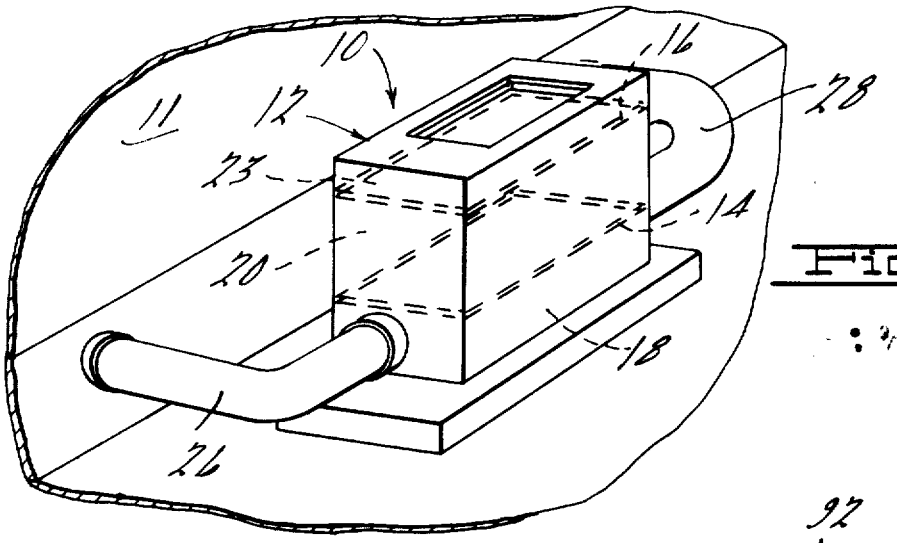
FIG. 1 is a perspective view of an air conditioning system according to the invention.

In the drawings, various standard units are not shown in detail because they are individually well known in the prior art. Standard units employed in the present invention include heat exchangers, which may be of the well known fin and tube type, a boiler, blowers, valves, electrically driven pumps, and spray nozzles.

Additionally, there are standard control devices (not shown) located within the enclosure to be conditioned, viz, a three-position heating-cooling switch, a thermostat, and a humidistat. The function of these control devices is well known in the prior art. For example, the three-position heating-cooling switch has a heating position, an off position, and a cooling position. In the heating position, the switch operates various components in the system to condition the system to function in a heating mode.

In the off position, the system is rendered inoperative. In the cooling position, the switch operates various components in the system which condition the system to function in a cooling mode. The thermostat functions to automatically turn the system on or off in response to enclosure temperatures different than a desired enclosure temperature which is set into the thermostat. For example, with the heating-cooling switch in the heating position, the thermostat will complete a circuit to turn the system on in response to an enclosure temperature below the thermostat setting and will open the circuit to turn the system off in response to an enclosure temperature above the thermostat setting. With the heating-cooling switch in the cooling position, the thermostat functions in a reverse manner, i.e., the thermostat opens the circuit to turn the system off in response to enclosure temperature below the thermostat setting and closes the circuit to turn the system on in response to enclosure temperature above the thermostat setting. When the humidity of the enclosure air is below a predetermined amount the humidistat completes a circuit to various components in the system which functions to add water to the enclosure air as it passes through the system.

Figure 2:
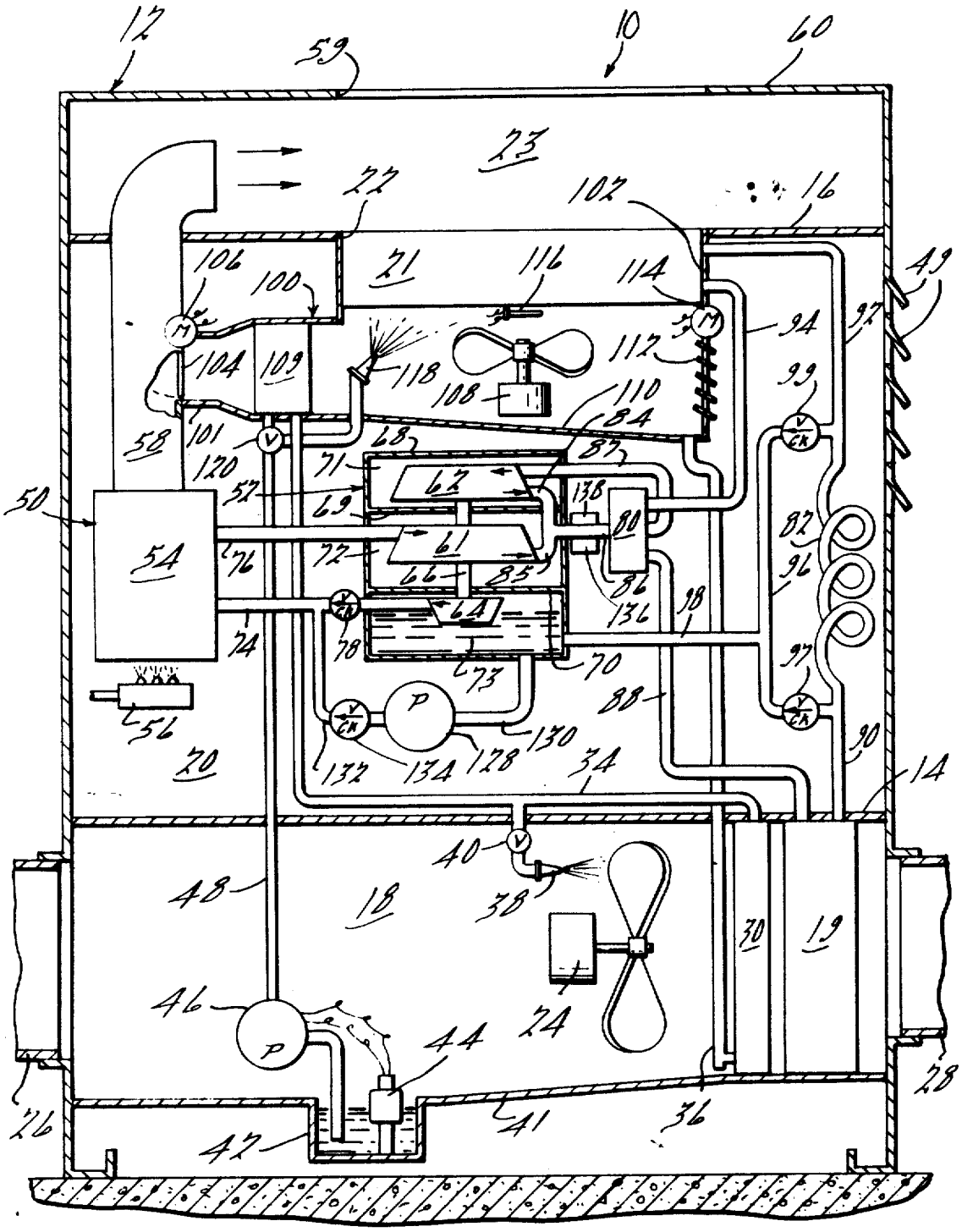
FIG. 2 is a schematic view of the system of FIG. 1.

The invention air conditioning system 10, as seen in FIGS. 1 and 2, is arranged to condition air in an enclosure 11. Broadly considered, system 10 comprises a housing 12 divided by transverse partitions 14 and 16 into a lower compartment 18 housing a first heat exchanger 19 arranged to receive and condition enclosure air, a central compartment 20 housing the power source for the system and further housing a second heat exchanger 21 positioned in a central opening 22 in partition 16 for communication with air outside the enclosure, and an upper compartment 23 defining a buffer or safety zone to isolate the machinery in compartment 20 from the area outside housing 12.

With reference now to FIG. 2, in addition to heat exchanger 19, lower compartment 18 contains a blower 24 for drawing air to be conditioned from enclosure 11 through a duct 26. Conditioned air is returned to enclosure 11 via a duct 28 after being blown over heat exchanger 19. Compartment 18 further contains another heat exchanger 30 positioned within compartment 18 immediately upstream of heat exchanger 19. Water is supplied to heat exchanger 30 via a pipe 34 positioned within central compartment 20; water is drained from heat exchanger 30 via a pipe 36. A water spray nozzle 38, directed toward heat exchangers 19, 30, is connected to pipe 34 via a valve 40. Valve 40, when open, allows water from pipe 34 to be sprayed over heat exchangers 19 and 30. Valve 40 is controlled electrically in any well known manner by the humidistat located in enclosure 11. A floor 41 positioned within compartment 18 is sloped toward a sump 42 which collects water from drain pipe 36 and condensate from heat exchanger 19. A float switch 44 in the sump controls a pump 46 which pumps water from the sump upwardly through a pipe 48.

With reference now to central compartment 20, the portion of housing 12 defining the right-hand wall of compartment 20 is provided with louvers 49 which allow ambient air to freely circulate into the compartment. The power source for the system, housed within compartment 20, includes a vapor generator 50 and a turbo unit 52. Vapor generator 50 comprises a boiler 54, a gas burner 56 disposed in heating relation beneath boiler 54, and a flue 58 arranged to direct the exhaust gases from burner 56 to atmosphere through upper compartment 23 and through a central opening 59 in top wall 60 of housing 12.

Turbo unit 52 comprises a turbine wheel 61, a compressor 62, and a liquid feed pump 64, all shown schematically. Turbine wheel 61, compressor 62, and pump 64 are concentrically mounted on, and fixed to rotate with [,] a common shaft 66 which is journaled in a unitary, hermeticaly sealed turbo housing 68 having a pair of partitions 69, 70. Partitions 69, 70 divide the interior of housing 68 into a compressor compartment 71, a turbine compartment 72, and a pump compartment 73. Pump compartment 73 houses pump 64 and provides a liqiuid receiver or reservoir for supplying the inlet of pump 64. Shaft 66 may be journaled in housing 68 in any conventional manner, such as by gas bearings (not shown). A pipe 74 interconnects the outlet of pump 64 and the inlet of boiler 54 and a pipe 76 interconnects the outlet of boiler 54 and the inlet of turbine wheel 61. A check valve 78 is positioned in pipe 74 to prevent vapor backflow from boiler 54.

Compartment 20 also houses a reversing valve 80 and an expansion means or fluid throttling device 82. A Y-shaped pipe having pipe portions 84, 85 and 86 interconnects an inlet of reversing valve 80 with the fluid discharge from turbine 61 and compressor 62. A pipe 87 interconnects the inlet of compressor 62 with an outlet of valve 80. A pipe 88 interconnects valve 80 and heat exchanger 19; a pipe 90 interconnects heat exchanger 19 and expansion means 82; a pipe 92 interconnects expansion means 82 and heat exchanger 21; a pipe 94 interconnects heat exchanger 21 and valve 80; a pipe 96 in parallel flow relationship with pipes 90 and 92 provides a bypass around expansion means 82; and a pipe 98 interconnects pipe 96 and receiver 73. A pair of check valves 97, 99, at the ends of bypass pipe 96 allow fluid from either pipe 90 or 92 to flow into pipe 96 and prevent reverse flow. Expansion means 82 may be a capillary restrictor tube or an expansion valve; both are well known in the art.

Valve 80 is a two-position, electrically controlled valve which is operated by the unshown heating-cooling switch located in enclosure 11; valve 80 may be of the general type disclosed in U.S. Pat. 3,003,334. When the heating and cooling switch is in the cooling position, valve 80 interconnects pipe 86 with pipe 94 and pipe 87 with pipe 88. When the heating and cooling switch is in the heating position valve 80 interconnects pipe 86 with pipe 88 and 87 with pipe 94.

Compartment 20 also houses an elbow-shaped duct 100 communicating at an end 101 with flue 58 and positioned at its other end 102 in opening 22 of partition 16. Heat exchanger 21 is positioned within end 102 of duct 100. A door valve 104, controlled by an electric motor 106, is positioned in duct end 101. A blower 108 is positioned within duct 100 beneath heat exchanger 21. A heat exchanger 109, positioned within duct 100 between valve 104 and blower 108, is connected at its inlet to pipe 48 and at its outlet to pipe 34. The upper end of pipe 36 is connected to a water condensate sump defined by a low area in the downward sloping floor 110 of duct 100. The right wall of duct 100 is provided with louvers 112 whose position may be varied by an electric motor 114. A control circuit, not shown, functions with the unshown enclosure heating-cooling switch in the cooling position to close door 104 and open louvers 112. Another unshown control circuit, including a thermostat 116 located in duct 100 between blower 108 and heat exchanger 21, functions with the enclosure heating-cooling switch in the heating position to synchronously control the positions of valve 104 and louvers 112.

Thermostat 116 functions to selectively modulate the position of valve 104 and louvers 112 when the system is in the heating mode to control the temperature of the air being blown over heat exchanger 21 by blower 108. For example, thermostat 116 may be set to maintain the air flowing over heat exchanger 21 at approximately 100° F. Assuming an outside air temperature of approximately 60° F., a small amount of the exhaust gasess from flue 58 will be required to boost the outside air flowing through louvers 112 to the required 100° F. Hence, valve 104 will be positioned to allow a small amount of exhaust gases from flue 58 to enter duct 100 while directing the remainder of the exhaust gases directly to atmosphere. As the ambient temperature decreases, valve 104 opens more and louvers 112 close more in response to thermostat 116, thereby maintaining the temperature of the air flowing over heat exchanger 21 at approximately 100° F.

A water spray nozzle 118 is positioned within duct 100 between heat exchangers 21 and 109. Nozzle 118 is connected to pipe 48 by a two-position solenoid valve 120 which, when energized, allows water communication between pipe 48 and nozzle 118 and blocks water communication between pipe 48 and heat exchanger 109 and, when deenergized, allows water communication between pipe 48 and heat exchanger 109 and blocks water communication between pipe 48 and nozzle 118.

Compartment 20 also houses an apparatus for starting the system and for providing an emergency heating mode. This starting and emergency heating apparatus comprises an electrically driven pump 128, a pipe 130 interconnecting pump 128 and receiver 73, a pipe 132 interconnecting pump 128 and pipe 74, a check valve 134 in pipe 130 which prevents reverse flow from pipe 74 when pump 128 is inoperative, and high and low temperature sensing switches 136, 138, respectively, arranged to sense the vapor discharge temperature in pipe 86.

STARTING OPERATION

To start the invention air conditioning system, the enclosure heating-cooling switch is moved to either the heating or cooling position. Assuming the enclosure temperature is below the setting of the enclosure thermostat with the heating-cooling switch in the heating position, or above the thermostat setting with the heating-cooling switch in the cooling position, an electrical circuit will be completed to the control valve for burner 56, whereby to light the burner, and to low temperature sensing switch 138. The contacts of switch 138 are designed to close whenever the turbine discharge temperature is below a predetermined temperature, such as 100° F. Since the system has been shut down, switch 138 will sense a temperature in pipe 86 below 100° F. and its contacts will be closed to complete a circuit to pump 128. Pump 128 will thus be energized to draw liquid refrigerant from receiver 73 through pipe 130; the liquid refrigerant from pump 128 is delivered to vapor generator 50 through pipes 132 and 74. The liquid refrigerant delivered to generator 50 is vaporized in boiler 54 by the heat from burner 56. The refrigerant vapor is delivered to turbine 61 through pipe 76. The refrigerant vapor drives turbine 61, and thereby compressor 62 and pump 64; refrigerant vapor discharge is delivered to pipe 86 where it heats switch 138 above 100° F. to cause the switch contacts to open and break the circuit to pump 128 which is thus deenergized. The pumping action for the system is now assumed by pump 64 which delivers liquid refrigerant to vapor generator 50 from receiver 73 through pipe 74.

OPERATION IN THE COOLING MODE

Figure 3:
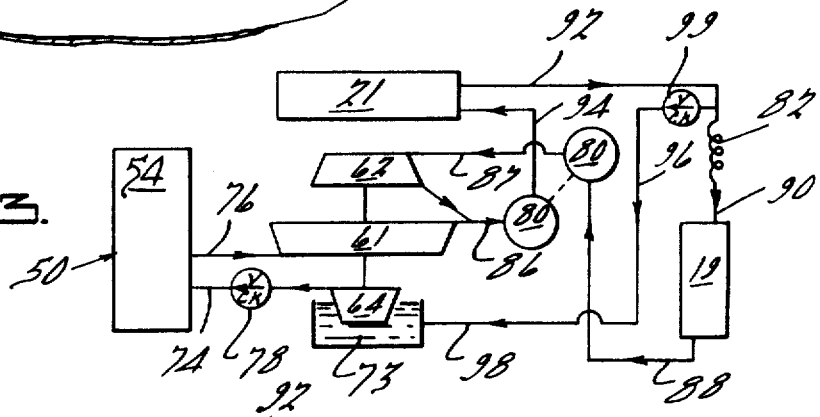
FIG. 3 is a diagram showing the refrigerant flow path when the system of FIG. 2 is operating in a cooling mode.

The described air conditioning system is capable of operating in three distinct modes, viz, a cooling mode, a heating mode, and an emergency mode. The operation of the system in the cooling mode is shown schematically in the refrigerant flow diagram of FIG. 3.

With the heating-cooling switch in the cooling position, the system is set to function in the cooling mode. Specifically, valve 80 is in its cooling mode position, i.e., pipes 86, 94 are interconnected and pipes 87, 88 are interconnected, and the thermostat in enclosure 11 will close its cooling contacts to complete a circuit for starting the system and maintaining the system in operation in response to enclosure air temperatures above the thermostat setting. With the system started as described under "Starting Operation," the vapor discharge from turbine 61 and compressor 62 is conducted to heat exchanger 21 via pipe 86, valve 80, and pipe 94. Heat exchanger 21 acts as a condenser; the vapor cools and liquifies as it flows through heat exchanger 21 by giving up heat to the outside air flowing over the heat exchanger. A pipe 92 conducts the liquified refrigerant from heat exchanger 21 to check valve 99 and to expansion means 82. A portion of the refrigerant flows through check valve 99 and returns to receiver 73 via pipes 96 and 98. The other portion flows through expansion means 82 and undergoes a pressure and temperature drop. The expanded refrigerant is conducted from the outlet of the expansion means to heat exchanger 19 which acts as an evaporator; as the refrigerant flows through heat exchanger 19, it vaporizes by absorbing heat from the enclosure air, thereby cooling the enclosure air. The vaporized refrigerant leaving heat exchanger 19 is conducted to the compressor inlet via pipe 88, valve 80, and pipe 87.

With reference now to FIG. 2, and with continued reference to operation of the system in the cooling mode, closing of the cooling contacts in the enclosure thermostat also completes a circuit to activate blowers 24, 108. When activated, blower 24 facilitates movement of enclosure air over heat exchanger 19 and blower 108 facilitates movement of air over heat exchanger 21. As noted previously, door 104 is closed in the cooling mode while louvers 112 are fully open so that the air being directed over exchanger 21 by blower 108 is comprised totally of ambient air flowing through louvers 49 and 112.

Additionally, means are provided, while operating in the cooling mode, to improve the heat dissipating capacity of heat exchanger 21. With the heating-cooling switch in the cooling position and the cooling contacts of the enclosure thermostat closed, an electric circuit is completed to float switch 44. When water is available in sump 42, float switch 44 closes to complete a circuit to pump 46 and valve 120. Valve 120 when activated interconnects pipe 48 with nozzle 118 and blocks connection of pipe 48 with heat exchanger 109. Pump 46 when activated pumps water from sump 42 to nozzle 118 which in turn sprays the water over heat exchanger 21, thereby wetting the outer surface of the heat exchanger and improving its heat dissipating capacity as the water evaporates. This arrangement also serves to dispose of the water condensate which collects in sump 42 from heat exchanger 19. In an arid region water condensate from heat exchanger 19 may not be adequate for operation of the heat improving means; in this event sump 42 may be replenished by the enclosure water system.

OPERATION IN THE HEATING MODE

Figure 4:
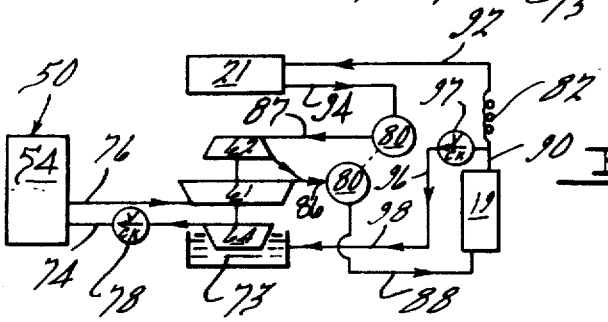
FIG. 4 is a diagram showing the refrigerant flow path when the system of FIG. 1 is operating in a heating mode.

The operation of the system in the heating mode is shown schematically in the refrigerant flow diagram of FIG. 4. With the heating-cooling switch in the heating position the system is set to function in the heating mode. Specifically, valve 80 is in its heating mode position, i.e., pipes 86, 88 are interconnected and pipes 87, 94 are interconnected, and the enclosure thermostat will close its heating contacts to complete a circuit for starting and maintaining the system in operation in response to enclosure air temperatures below the thermostat setting. With the system started as described under "Starting Operation," refrigerant flow through heat exchangers 19, 21 and expansion means 82 is reversed with respect to refrigerant flow in the cooling mode. Specifically, the vapor discharge from turbine 61 and compressor 62 is now conducted to heat exchanger 19 via pipe 86, valve 80, and pipe 88. Heat exchanger 19 now acts as a condenser; the vapor cools and liquifies as it flows through the exchanger by giving up heat to the enclosure air flowing over the exchanger, whereby to heat the enclosure air. Pipe 90 conducts the liquid refrigerant discharge from heat exchanger 19 to check valve 97 and to expansion means 82. A portion of the liquid refrigerant flows through check valve 97 for return to receiver 73 via pipes 96 and 98. The other portion flows through expansion means 82 and undergoes a pressure and temperature drop. The expanded refrigerant is conducted from the outlet of the expansion means to heat exchanger 21 which now acts as an evaporator; as the refrigerant flows through exchanger 21, it vaporizes and absorbs heat from the outside air flowing over it. The vaporized refrigerant leaving heat exchanger 21 is conducted to the compressor inlet via pipe 94, valve 80, and pipe 87.

With reference now to FIG. 2 and with continued reference to the operation of the system in the heating mode, closing of the heating contacts in the enclosure thermostat also completes a circuit to activate blowers 24, 108. When activated, as in the cooling mode, blower 24 facilitates movement of enclosure air over heat exchanger 19, and blower 108 facilitates movement of air over heat exchanger 21.

Additionally, closure of the heating contacts further activates means for improving the system coefficient of performance. Specifically, when the heating contacts are closed thermostat 116 and its associated control circuit are activated to selectively modulate the synchronous operation of door valve 104 and louvers 112 to maintain the air flowing over heat exchanger 21 at approximately 100° F., thereby improving the system's coefficient of performance by using waste heat from the exhaust gases. For example, assuming a cold winter day with an outside temperature of 10° F. thermostat 116 will function to open door 104 a substantial amount while substantially closing louvers 112, thereby mixing a large volume of exhaust gases from flue 58 with the relatively small volume of cold outside air flowing through the louvers 112 to produce a 100° F. air flow over heat exchanger 21.

The coefficient of performance of the system in the heating mode is further improved by providing apparatus for optimizing the amount of heat extracted from the exhaust gases. This apparatus comprises heat exchangers 30, 109, pump 46, and interconnecting pipes and controls. Since heat exchanger 21 acts as an evaporator during the heating mode, condensate will be precipitated from moisture laden air flowing over its outer surface. This condensate is communicated to sump 42 via pipe 36. With the heating-cooling switch in the heating position and the heating contacts of the enclosure thermostat closed, an electric circuit is completed to float switch 44. Float switch 44 completes a circuit to activate pump 46 if water is available in sump 42. Pump 46, when activated, pumps water from sump 42 through heat exchanger 109 via pipe 48 and deenergized valve 120. The water is returned to sump 42 via pipe 34 and heat exchanger 30. The water flowing through heat exchanger 109 absorbs heat from the exhaust gases flowing over its outer surface, thereby precooling the exhaust gases flowing over the heat exchanger 21 and allowing greater volumes of the exhaust gases to be used for this purpose. The heated water from heat exchanger 109 then flows to heat exchanger 30 where it rejects heat to the enclosure air circulating toward heat exchanger 19.

Means are also provided for improving the humidity of the conditioned air while operating in the heating mode. Specifically, the enclosure humidistat is operable in response to sensing a low humidity condition to complete a circuit to open valve 40, thereby allowing water from pipe 34 to be sprayed over heat exchangers 19, 30 by nozzle 38.

OPERATION IN THE EMERGENCY MODE

Figure 5:
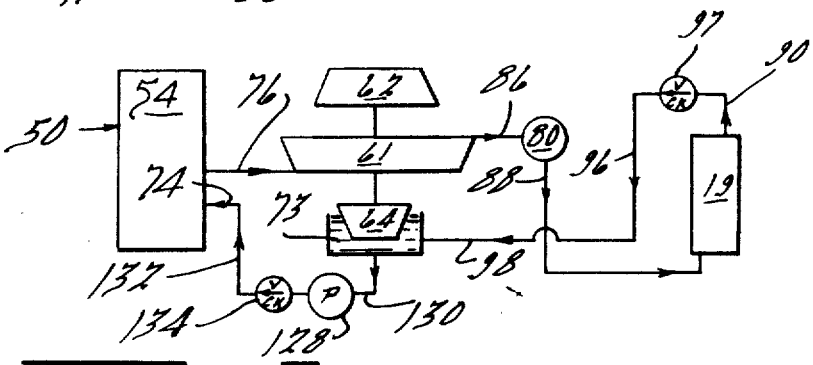
FIG. 5 is a diagram showing the refrigerant flow path when the system of FIG. 1 is operating in an emergency mode due to failure of the turbine unit.

The disclosed air conditioning system also embodies provision for operation in an emergency heating mode in the event of failure of turbo unit 52. The operation of the system in the emergency mode is shown schematically in the refrigerant flow diagram of FIG. 5. With the system operating in the heating mode, the emergency mode is automatically switched on when switch 136 senses a turbine vapor discharge temperature exceeding a predetermined value, such as 250° F.; this excess temperature, which is indicative of failure of turbo unit 52, causes switch 136 to close its contacts to complete an electrical circuit to energize pump 128. Pump 128, when energized by switch 136, provides liquid refrigerant from receiver 73 to boiler 54 to maintain the system in operation. Specifically, hot refrigerant vapor from boiler 54 flows through pipe 76, disabled turbine 61, pipe 86, valve 80, pipe 88, heat exchanger 19, pipe 90, check valve 97, pipes 96, 98, receiver 73, pipe [30] *130*, pump 128, check valve 134, and pipes 132, 74. In this mode of operation, the heating capacity of the system is diminished, but is effective enough to provide heat to the enclosure until repairs can be made on the turbo unit. With the turbo unit 52 inoperative and the system operating in the emergency mode, heat exchanger 21 and expansion means 82 are in effect bypassed. It will be understood that "failure" of turbo unit 52 may consist, for example, of seizure of shaft 66 or disintegration of turbine or compressor blading.

The preferred embodiment of the invention has been disclosed for illustrative purposes. The following claims are intended to cover the inventive portions of the preferred embodiment and variations or modifications within the spirit of the invention.

I claim:

1. A liquid-vapor cycle air conditioning system for maintaining the air of an enclosure in a predetermined condition, said system comprising:

A. a vapor generator;

B. means for supplying a liquid to said generator;

C. means directing hot gases to said vapor generator to vaporize said liquid;

D. means receiving vapor from said generator and operative to transform heat energy of said vapor to mechanical energy;

*E. means directing discharge fluid from said energy transforming means to said supplying means;*

*F* [E]. a compressor driven by said mechanical energy;

*G* [F]. a first heat exchanger receiving a discharge fluid from said compressor;

*H* [G]. means directing enclosure air to said first heat exchanger;

*I* [H]. expansion means receiving discharge fluid from said first heat exchanger;

*J* [I]. a second heat exchanger receiving discharge fluid from said expansion means;

*K* [J]. means directing outside air to said second heat exchanger;

*L* [K]. means directing discharge fluid from said second heat exchanger to said compressor; and

*M* [L]. means for directing at least a portion of said hot gases into a heat exchange relation with said second heat exchanger.

2. A system according to Claim 1 and further including:

*N* [M]. means for collecting water condensate from said hot gases in said heat exchange relation with said second heat exchanger; and

*O* [N]. means for introducing said condensate to said enclosure air.

3. A system according to Claim 1 and further including:

*N* [M]. a third heat exchanger positioned in the path of said hot gases;

*O* [N]. a fourth heat exchanger positioned in a heat exchange relation with said enclosure air;

*P* [O]. means for conducting a fluid to said third heat exchanger and then to said fourth heat exchanger, thereby extracting heat from said hot gases at said third heat exchanger and adding heat to said enclosure air at said fourth heat exchanger.

4. A system according to Claim 3, wherein:

*Q* [P]. the fluid conducted to said third and fourth heat exchanger is water; and

*R* [Q]. said system further includes means for selectively admitting at least a portion of said water to said enclosure air, thereby improving the humidity of said enclosure air.

5. A system according to Claim 4 and further including:

S [R]. means for collecting water condensate from said hot gases; and

T [S]. means for supplying said water condensate to said conducting means.

6. A liquid-vapor cycle air conditioning system for maintaining the air of an enclosure in a predetermined condition, said system comprising:

A. a vapor generator;

B. means supplying a liquid to said vapor generator;

C. means receiving a vapor from said generator and operative to transform the heat energy of said vapor to mechanical energy;

D. a compressor driven by said mechanical energy;

E. a first heat exchanger in a heat exchange relation with the air of said enclosure;

F. a second heat exchanger in a heat exchange relation with air outside of said enclosure;

G. expansion means interconnecting said first and second heat exchanger; and

H. valve means interposed between said first and second heat exchangers and selectively movable between (1) a first position in which discharge fluid from said energy transforming means and said compressor is directed to said first heat exchanger and from said first heat exchanger to said expansion means, thence to said second heat exchanger, and thence to the inlet of said compressor, and (2) a second position in which discharge fluid from said energy transforming means and compressor is directed to said second heat exchanger and from said second heat exchanger to said expansion means, thence to said first heat exchanger, and thence to the inlet of said compressor.

7. A system according to Claim 6 and further including:

I. means operative to collect water condensate formed on said first heat exchanger when said valve means is in said second position; and J. means for placing said water condensate in communication with said second heat exchanger, thereby improving the heat dissipation of said second heat exchanger.

8. A system according to Claim 6, wherein:

I. said transforming means comprises a turbine on a common shaft with said compressor; and J. said supplying means is mounted on and driven by said shaft.

9. A system according to Claim 8 and further including:

K. a unitary, hermetically sealed housing having said common shaft journaled therein; and L. means in said housing defining a fluid reservoir receiving a portion of the outlet fluid from said first heat exchanger and supplying the inlet of said pump.

10. A system according to Claim 9, wherein:

M. said pump is positioned within said reservoir.

11. A system according to Claim 9 and further including:

M. means for sensing an operational failure of the turbine-compressor-pump unit and operative in response to such sensed failure to establish an alternate fluid flow path from said first heat exchanger to said generator bypassing said pump; and N. a second pump in said alternate flow path energized in response to said sensed failure.

12. A system according to Claim 11, wherein:

O. said second pump is connected at its inlet to said reservoir.

13. A system according to Claim 9 and further including:

M. means for starting said system, said means comprising (1) a second pump, and (2) sensing means operable to energize said second pump in response to sensing an inoperative condition of said system and an enclosure air-condition different than said predetermined condition.

14. A system according to Claim 13, wherein:

N. said sensing means for sensing said inoperative condition and said enclosure air-condition includes, respectively, (1) switch means responsive to the fluid discharge temperature of said turbine and compressor, and (2) a thermostat responsive to the temperature of said enclosure air.

15. A liquid-vapor cycle air conditioning system for maintaining the air of an enclosure in a predetermined condition, said system comprising:

A. a vapor generator;

B. a turbo unit having (1) a hermetically sealed housing, (2) a shaft journaled in said housing, (3) a compressor secured to said shaft, (4) a pump secured to said shaft and having an outlet connected to the inlet of said vapor generator, and (5) a turbine secured to said shaft and having an inlet connected to the outlet of said vapor generator;

C. a first heat exchanger in a heat exchange relation with the air of said enclosure;

D. a second heat exchanger in a heat exchange relation with air outside of said enclosure;

E. expansion means; and

F. means directing the combined fluid discharge of said tubine and compressor to said first heat exchanger and then a portion of the discharge fluid of said first heat exchanger to the inlet of said pump and the other portion to said expansion means, then to said second heat exchanger, and then to the inlet of said compressor.

16. A system according to Claim 15 further including:

G. means for controlling the temperature of the outside air in heat exchange relation with said second heat exchanger.

17. A system according to Claim 16, wherein:

H. said vapor is generated by flowing hot gases over said vapor generator; and

I. said temperature controlling means includes synchronously controlled valve means selectively operative to direct varying portions of said hot gases and said outside air into heat exchange relation with said second heat exchanger.

18. A system according to Claim 17, wherein:

J. said vapor generator includes a fuel combusting device for producing said hot gases.

19. A system according to Claim 18 and further including:

K. means for collecting water condensate from said gases in said heat exchange relation with said second heat exchanger; and L. means for introducing said condensate to said enclosure air.

20. A system according to Claim 18 and further including:

K. a third heat exchanger positioned in the path of said exhaust gases;

L. a fourth heat exchanger positioned in a heat exchange relation with said enclosure air;

M. means for conducting a fluid to said third heat exchanger and then to said fourth heat exchanger, thereby extracting heat from said exhaust gases at said third heat exchanger and adding heat to said enclosure air at said fourth heat exchanger.

21. A system according to Claim 20, wherein:

N. the fluid conducted to said third and fourth heat exchanger is water; and

O. said system further includes means for selectively admitting at least a portion of said water to said enclosure air, thereby improving the humidity of said enclosure air.

22. A system according to Claim 21 and further including:

P. means for collecting water condensate from said varying portions of the exhaust gases; and Q. means for supplying said water condensate to said conducting means.

23. A system according to Claim 22 and further including:

R. valve means selectively movable between (*1*) a first position in which the fluid flows in accordance with Claim 15, and (*2*) a second position in which said combined discharge fluid is routed to flow to said second heat exchanger and from said second heat exchanger (a) in part to the inlet of said pump, and (b) in part to said expansion means, thence to said first heat exchanger, and thence to said compressor;

S. means operative to collect water condensate formed on said first heat exchanger when said valve means is in said second position; and T. means for placing said water condensate in communication with said second heat exchanger, thereby improving the heat dissipation of said second heat exchanger.

24. A system according to Claim 15, wherein said directing means includes:

G. valve means selectively movable between (*1*) a first position in which the fluid flows in accordance with Claim 15, and (*2*) a second position in which said combined discharge fluid is routed to flow to said second heat exchanger and from said second heat exchanger (a) in part to the inlet of said pump, and (b) in part to said expansion means, thence to said first heat exchanger, and thence to said compressor.

25. A system according to Claim 24 and further including:

H. a first one-way check valve for preventing fluid flow from said pump inlet to said second heat exchanger when said valve means is in said first position; and I. a second one-way check valve for preventing fluid flow from said pump inlet to said first heat exchanger when said valve means is in said second position.

26. A system according to Claim 15 and further including:

G. means for sensing an operational failure of said turbo unit and operative in response to such sensed failure to establish an alternate fluid flow path from said first heat exchanger to the inlet of said vapor generator bypassing said pump; and H. a second pump in said alternate flow path energized in response to said sensed failure.

27. A system according to Claim 26, wherein said sensing means includes:

I. means for sensing the fluid discharge temperature of said turbine and operative to establish said alternate flow path in response to said temperature exceeding a predetermined amount.

28. A system according to Claim 15 and further including:

G. means for providing starting fluid to said vapor generator, said means comprising (1) a second pump for supplying fluid to the inlet of said vapor generator, and (2) sensing means operable to energize said second pump in response to sensing an inoperative condition of said turbo unit and an enclosure air temperature different than said predetermined condition.

29. A system according to Claim 28, wherein said means sensing an inoperative condition of said turbo unit includes:

H. means for sensing the fluid discharge temperature of said turbine and operable in response to discharge temperatures below a predetermined amount.

30. A liquid-vapor cycle air conditioning system for maintaining the air of an enclosure in a predetermined condition, said system comprising:

A. a vapor generator;

B. first and second heat exchangers;

C. a fluid reservoir;

D. a turbo unit having (1) a hermetically sealed housing, (2) a shaft journaled in said housing, (3) a compressor secured to said shaft, (4) a pump secured to said shaft and having an inlet in fluid connection with said reservoir and an outlet connected to the inlet of said vapor generator, and (5) a turbine secured to said shaft and having an inlet connected to the outlet of said vapor generator;

E. expansion means interconnected between said first and second heat exchangers;

F. means operative to selectively switch said system between (1) a first operational mode in which one of said heat exchangers is disposed in heat exchange relation with the enclosure air and the combined discharge of said compressor and turbine is directed to that heat exchanger and the discharge from the other heat exchanger is directed to the inlet of said compressor, and (2) a second operational mode in which one of said heat exchangers is disposed in heat exchange relation with the air outside said enclosure and said combined discharge is directed to that heat exchanger and the discharge from the other heat exchanger is directed to the inlet of said compressor; and G. means operative in either operational mode to direct a portion of the discharge from the heat exchanger receiving said combined discharge to said reservoir and the remaining portion to said expansion means.

*31. A system according to Claim 1 wherein:*

*N. said energy transforming means includes turbine means; and*

*O. said supplying means includes a pump driven by said turbine means.*

References Cited

The following references, cited by the Examiner, are of record in the patented file of this patent or the original patent.

UNITED STATES PATENTS

| | | | |
|---|---|---|---|
| 3,153,442 | 10/1964 | Silvern | 165—50 |
| 3,519,066 | 7/1970 | Anderson | 165—50 |

CHARLES SUKALO, Primary Examiner

U.S. Cl. X.R.

165—50, 66